Figure 1:
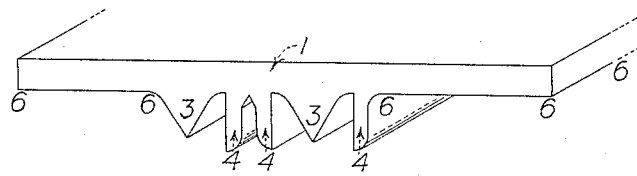

F. W. SKINNER.
METHOD OF CONNECTING TOGETHER METAL BARS, PLATES, OR SHAPES BY MEANS OF AN INTERLOCKED ROLLED JOINT.
APPLICATION FILED NOV. 13, 1913.

1,163,784.

Patented Dec. 14, 1915.

2 SHEETS—SHEET 1.

WITNESSES:
Chas W Bucknall.
M Jary

INVENTOR
Frank W. Skinner

F. W. SKINNER.
METHOD OF CONNECTING TOGETHER METAL BARS, PLATES, OR SHAPES BY MEANS OF
AN INTERLOCKED ROLLED JOINT.
APPLICATION FILED NOV. 13, 1913.

1,163,784. Patented Dec. 14, 1915.

WITNESSES:
Chas. W. Bucknall.

INVENTOR
Frank W. Skinner

UNITED STATES PATENT OFFICE.

FRANK W. SKINNER, OF TOMPKINSVILLE, NEW YORK.

METHOD OF CONNECTING TOGETHER METAL BARS, PLATES, OR SHAPES BY MEANS OF AN INTERLOCKED ROLLED JOINT.

1,163,784.   Specification of Letters Patent.   Patented Dec. 14, 1915.

Application filed November 13, 1913. Serial No. 800,724.

*To all whom it may concern:*

Be it known that I, FRANK W. SKINNER, a citizen of the United States, residing at No. 41 Sherman avenue, Tompkinsville, in the county of Richmond and State of New York, have invented a new and useful Method of Connecting Together Metal Bars, Plates, or Shapes by Means of an Interlocked Rolled Joint, of which the following is a specification.

My invention relates to a new method of permanently joining together two pieces of rolled metal to form the whole or a portion of a beam, strut, chord, trough, conduit, pipe cylinder, column or any closed or partly closed structural or fabricated member.

The joints can be made entirely by rolling, by first rolling longitudinal projecting elements on the joint surface or face and then superimposing those faces and rolling them together under powerful pressure, causing the elements to become rigidly and permanently interlocked in a strong, solid joint.

Heretofore in practice the elements of all metal members, and various other fabricated sections like pipes, conduits, etc., composed of rolled plates and shapes have been bolted or riveted together except when, at relatively great expense, they have been welded.

Riveting structural members involves the laying out and punching or drilling of holes and the driving of rivets, and the use of expensive and powerful punches, drills and riveting machines, and costly rivets. It very seriously reduces the cross sections of the pieces riveted, thus injuriously weakening them, and introducing other disadvantages. This work can not be done by the rolling mill machinery, but necessarily involves the use of entirely different fabricating tools and the removal of the pieces from the mill to a fabricating shop.

By my method, plates, bars, shapes and other structural elements are very rapidly, quickly and perfectly joined together at a slight cost.

The joint is very much stronger, smoother and tighter than a riveted joint, and no laying off, punching, drilling or riveting is involved. The pieces require no preparation whatever, but are ready as they come from the rolling mill, and may be immediately joined together by passing through proper grooves in the same roll train in which they were made, thus finishing the completed member at the rolling mill, or the elements may be shipped to any fabricating shop and there have the joints made by rolling, by pressing, or by hammering.

The full original gross cross-sections of the pieces are preserved and the metal is not only uninjured, but its strength is increased by the fabrication of the joint. There is no waste and no deterioration or injury of metal. There are no exterior projections, the joints are perfectly smooth and tight and develop a far greater and more efficient frictional strength than is the case with any other form of fabricated joint. The joint involves no hand labor, fitting or heating. It may be made entirely in the standard rolls, its parts are always exact and interchangeable and the completed joints must therefore necessarily be uniform and perfect, and are not subject to injury, imperfection, or uncertainty of fabrication as are all other kinds of fabricated joints.

The joint is applicable to any surface formed parallel to the axis of the rolling mill rolls and the principal features of its construction are the formation, in the rolls, when the bar, plate or shape is made, of a series of alternating longitudinal spurs and flanges projecting above the general surface of the piece, and integral with it; the placing of two pieces together with the spurs of the one piece registering between the flanges of the other piece and vice versa; and the forcing together of the two pieces by pressure applied in any way to the back of each piece, perpendicular to the plane of the joint, thus causing the spurs to deflect the flanges, forcing the latter into inclined positions interlocking with each other and forming a series of dovetails making up a solid interlocked joint.

The supreme advantage of this joint lies in the fact that the pieces can be prepared for it wholly and entirely in the ordinary process of their regular manufacture in the rolling mill, without involving any extra time, labor, or cost whatever over that necessary for the production of plain, ordinary rolled bars, plates or shapes, and that after the separate pieces, of any description required, are delivered from the rolls, the joints can be completely fabricated by passing them quickly through the same or another roll train, thus making a continuous and very rapid and inexpensive process and accomplishing the fabrication of the joint by the simplest, most efficient, and powerful operations.

Figure 2:
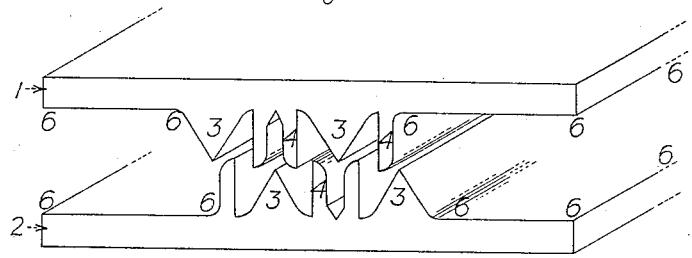
Figure 3:
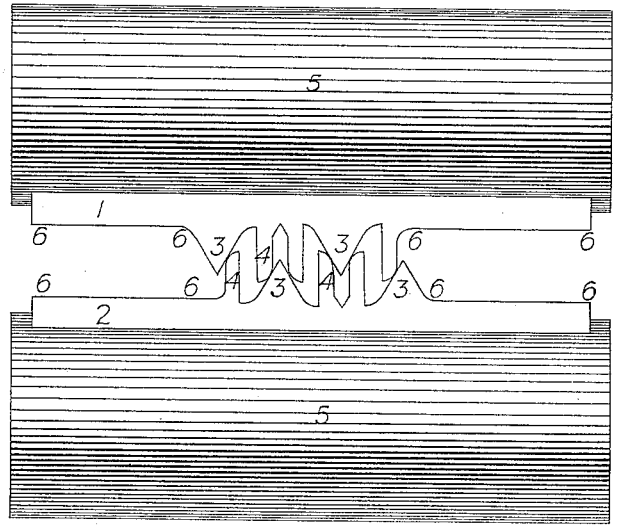
Figure 4:
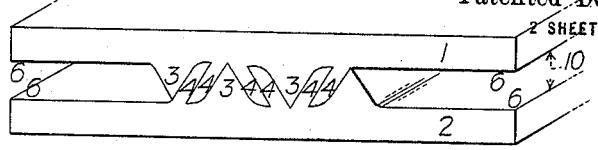
Figure 5:
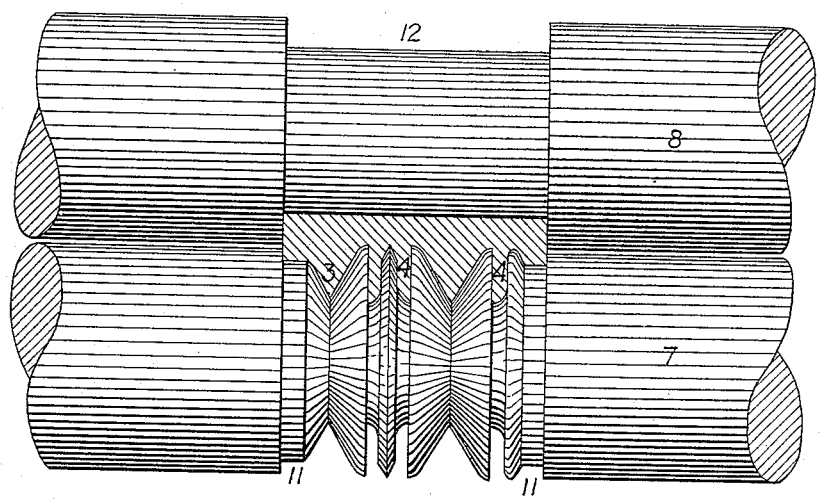
Figure 6:
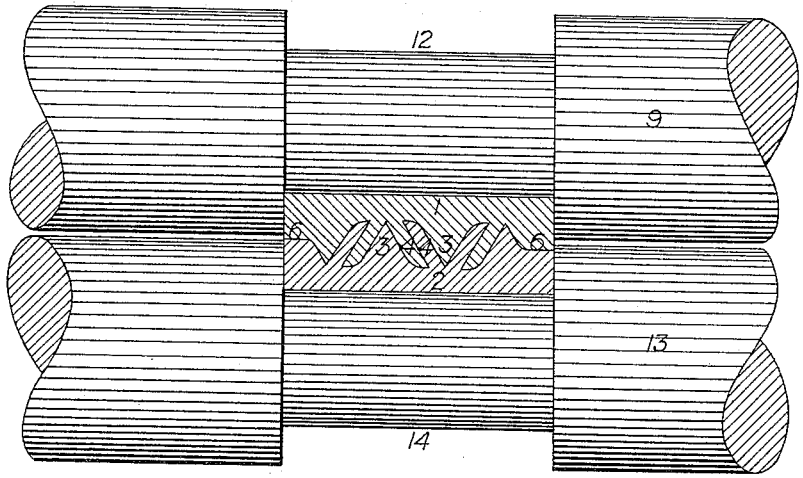

In the drawings: Figure 1 is a perspective view of a plate or bar with spurs and flanges rolled integral with it for a fabricated interlocked joint. Fig. 2 is a perspective view of a bar or plate registered with a corresponding bar or plate in readiness for the fabrication of the joint. Fig. 3 is an end elevation of the registered pieces inserted between a pair of rolls which, by their operation force the pieces together under heavy pressure and form the joint by deflecting and interlocking the longitudinal flanges of one piece with those of the other piece. Fig. 4 is a perspective view of the completed joint between the two pieces. Fig. 5 is an elevation of a pair of manufacturing rolls adapted to form one member of an interlocked joint, and, shows a cross section of a flat joint bar engaged between the rolls. Fig. 6 is an elevation of a pair of fabricating rolls adapted to force two flat-joint bars into engagement and form the interlocked joint, and shows in cross section, a pair of flat-joint bars in interlocked engagement.

The finished joint shown in Fig. 6 differs from that shown in Fig. 4, in that the spurs and flanges 3 and 4, are formed partly above and partly below the joint surfaces of pieces 1 and 2, instead of wholly above them as in Fig. 4, so that when engaged to make the finished joint, the flat surfaces 6. 6 of pieces 1 and 2 adjacent to the joint, are in contact, instead of being separated as in Fig. 4.

In Fig. 1, longitudinal spurs, 3—3 and flanges 4—4 are rolled integral with the plate or bar 1. The sides of the flanges 4—4 are perpendicular, and the sides of the spurs 3—3 are inclined to the joint surface 6—6—6—6—6 of the plate or bar 1 and to the axes of the rolls. There must be at least two flanges and one spur or any multiple of spurs and pairs of flanges, but it is desirable that each piece 1, should have a series of spurs and flanges commencing with a single flange followed by a spur and a pair of flanges, a spur and a pair of flanges and so on and ending with a spur, so that there is a right and a left hand side and the duplicate pieces, reversed, end for end, register properly together for the formation of a joint as shown in Figs. 2—3—4 and 6, thus eliminating the necessity for two different sets of spurs and flanges for a joint.

Fig. 2 shows one piece 1, of Fig. 1, registering with another piece 2, which here is a duplicate of 1, turned end for end, but may be any other piece with flanges and spurs arranged to match those of piece 1.

Fig. 3 shows the two registered pieces 1 and 2 of Fig. 2 entering between a pair of fabricating rolls 5—5. The revolution of these rolls draws the pieces through them and forces them powerfully together with a pressure heavy enough to cause the spurs 3—3 of one piece to deflect the flanges 4—4 of the other piece into the oblique positions shown in Fig. 4, thus making a dove-tailed interlock between them and causing the projections in each piece to exactly fill the spaces in the other piece, creating a great pressure friction between their surfaces and making a tight solid joint of great strength.

In Fig. 4 the completely fabricated interlocked joint is shown in cross section with the flanges 4—4—4 of piece 1, deflected to oblique positions by the spurs 3—3 of piece 2 and making close contact with said spurs and with the deflected flanges 4—4 of piece 2. Similarly the flanges 4—4—4 of piece 2 have been deflected into oblique positions by the spurs 3—3 of piece 1 and are in complete engagement and close contact with the spurs and flanges of piece 1. As the spurs and flanges of pieces 1 and 2 were both formed wholly beyond the joint surfaces 6—6 of the pieces, these joint surfaces 6—6 are separated by a space 10 in the finished joint.

In Fig. 5 one roll, 7, is provided with grooves 11, corresponding to the spurs and flanges 3 and 4 of the joint bar and the other roll, 8, has a groove, 12 corresponding to the opposite surface of the joint bar.

In Fig. 6, the fabricating rolls 9 and 13 have grooves 12 and 14 corresponding to the surfaces opposite the spurs and flanges of the two joint pieces. The grooves may be duplicate as here shown, or if the joint spurs and angles are formed, as is often the case, on the surfaces of flat plates or bars, the grooves may be omitted and the joint pieces may be rolled together between plain rolls without grooves, as shown in Fig. 3.

The same or corresponding parts are designated by the same reference numerals in all figures.

My joint is made by rolling on the surfaces of bars, shapes, plates or others sections of metal, complementary sets of projecting longitudinal spurs and flanges the coacting surfaces of the respective spurs and flanges having an oblique relation with respect to each other, superimposing one piece on the other with the spurs and flanges or one piece in contact with and registering respectively with the flanges and spurs of the other piece, and then applying pressure, normal to the joint plane, to both pieces from end to end of the joint, and, thus causing the spurs and flanges to be forced together until their surfaces are forced into complete contact and the flanges are permanently deflected into oblique interlocking positions forming a series of interwoven dovetails, opposed by the shearing and bending strength of the metal to displacement parallel or perpendicular to the surface of the metal, and opposed by the high degree of frictional resistance developed to any longitudinal displacement.

This operation of forcing the elements of the joint into interlocked positions is extremely beneficial to the metal because when the parts are properly proportioned and compressed the bending of the metal produces a large increase in the elastic limit and therefore in the efficient safe working strength of the metal. The displacement of the metal in the flanges which are bent to oblique interlocking positions by the fabricating pressure normal to the joint surface also develops a high degree of elasticity which tends to force the flanges back toward their original positions and thus forms a positive and permanent pressure gripping the contact surfaces very tightly together and creating an enormous amount of friction which is beneficial and adds vastly to the strength of the joint.

The rolled elements of each joint surface are so arranged that there are a plurality of single spurs alternating with pairs of flanges. The spurs are triangular in cross section, the base of the triangle being integral with the body of the piece, and the apex projecting beyond the general surface. The flanges have approximately rectangular cross sections with their long sides perpendicular to the general plane of the joint and to the surface of the piece. Preferably the exterior corners are rounded and the interior corners or angles are correspondingly filleted. The flanges have a thickness relatively small as compared to their height perpendicular to the plane of the joint.

The two flanges in each pair are separated with a clearance sufficient for the entrance of the apex of the spur, and their outer edges are close to the bases of the spurs so that when the spurs and flanges of opposite pieces are fully engaged and interlocked, the spaces between the spurs and flanges of one piece are completely filled by the flanges and spurs of the opposite piece.

In the process of making an interlocked, fabricated, metal joint I claim,

1. The method of making metal joint members which comprises rolling one of the pieces to be united and simultaneously during said rolling action providing its face with a plurality of longitudinal projections and recesses and rolling the other piece to be united with the first piece and simultaneously providing its face with a plurality of longitudinal projections and recesses, the projections and recesses of the said pieces to be united having their coacting surfaces in oblique relation with respect to each other, the said projections and recesses being suitably located on the surface of each piece so that corresponding projections and recesses on the pieces are adapted to be forced into interlocking engagement with each other.

2. In the fabrication of an interlocked metal joint, the steps which comprise assembling in superimposed relation two longitudinally extending members each having ribs and flanges extending lengthwise of the members, and forcing the members of the joint together by a rolling action until the flanges are transversely deflected and displaced into close contact, interlocked together, substantially as described.

3. The process of fabricating an interlocked metal joint, which comprises the formation by rolling of longitudinal spurs and flanges on the surface of each piece to be united in the same operation by which the pieces are formed, assembling two pieces, one face superimposed on the other, with its spurs and flanges registering with the flanges and spurs of the other piece, and then forcing together the two superimposed faces of the joint members perpendicular to the general plane of the joint, until the flanges are transversely deflected into complete engagement with each other in oblique interlocking position, substantially as described.

4. The process of fabricating an interlocked metal joint which comprises the formation on the surface of each joint member of a plurality of longitudinal spurs and flanges, the assembling together of two overlapping or superimposed faces of the joint members with the spurs and flanges of one face registered between and engaging the flanges and spurs of the other face and then forcing the two joint members together in a direction normal to the general plane of the joint until the flanges are deflected transversely into oblique positions interlocked with and in complete contact with each other substantially as described.

Signed at New York city, this 12th day of November, 1913.

FRANK W. SKINNER.

Witnesses:
ALANSON SKINNER,
M. S. SKINNER.

Copies of this patent may be obtained for five cents each, by addressing the "Commissioner of Patents, Washington, D. C."